US010593019B2

(12) United States Patent
Jain et al.

(10) Patent No.: US 10,593,019 B2
(45) Date of Patent: Mar. 17, 2020

(54) METHOD AND APPARATUS FOR STORING, PROCESSING AND RECONSTRUCTING FULL RESOLUTION IMAGE OUT OF SUB BAND ENCODED IMAGES

(71) Applicant: Samsung Electronics Co., Ltd., Suwon-si, Gyeonggi-do (KR)

(72) Inventors: Anurag Mithalal Jain, Bangalore (IN); Ravindranath Ramalingaiah Munnan, Bangalore (IN); Venkata Ravisankar Jayanthi, Bangalore (IN); Rajat Agarwal, Dehradun (IN); Ashish Ranjan, Jehanabad (IN); Joy Dutta, Kolkata (IN); Yongman Lee, Seongnam-si (KR); Sungoh Kim, Suwon-si (KR); Jae Hun Cho, Suwon-si (KR); Kwangyoung Kim, Suwon-si (KR); Hyunhee Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 6 days.

(21) Appl. No.: 14/884,079

(22) Filed: Oct. 15, 2015

(65) Prior Publication Data
US 2016/0110849 A1 Apr. 21, 2016

(30) Foreign Application Priority Data

Oct. 17, 2014 (IN) .......................... 5205/CHE/2014
Sep. 30, 2015 (IN) .......................... 5205/CHE/2014

(51) Int. Cl.
| | |
|---|---|
| G06T 5/00 | (2006.01) |
| H04N 19/60 | (2014.01) |
| G06T 3/40 | (2006.01) |
| H04N 19/50 | (2014.01) |
| G06T 9/00 | (2006.01) |

(52) U.S. Cl.
CPC ................ G06T 5/001 (2013.01); G06T 3/40 (2013.01); G06T 9/00 (2013.01); H04N 19/50 (2014.11); H04N 19/60 (2014.11)

(58) Field of Classification Search
None
See application file for complete search history.

(56) References Cited

U.S. PATENT DOCUMENTS

| | | | |
|---|---|---|---|
| 8,804,036 B1 | 8/2014 | Woodall | |
| 2005/0213833 A1* | 9/2005 | Okada | G06F 3/1431 382/240 |
| 2006/0152609 A1* | 7/2006 | Prentice | G06T 1/0007 348/272 |

(Continued)

Primary Examiner — Yanna Wu
(74) Attorney, Agent, or Firm — Jefferson IP Law, LLP

(57) ABSTRACT

A method and apparatus for storing, processing and reconstructing full resolution image out of sub band encoded images are provided. The method of rendering high resolution images based on sub-band encoded data of an image includes steps of performing downscaling of a selected image, creating a time-stamped downscaled image, extracting sub-band information associated with the selected image at one instance in time, compressing the downscaled image and the sub-band information, and decompressing and adding the sub-band information with extrapolated downscaled image to reconstruct and render high resolution image.

24 Claims, 12 Drawing Sheets

(56) References Cited

U.S. PATENT DOCUMENTS

| | | | |
|---|---|---|---|
| 2007/0248285 A1* | 10/2007 | Lippincott | G06T 3/4007 |
| | | | 382/298 |
| 2009/0060388 A1 | 3/2009 | Shingai et al. | |
| 2010/0091136 A1* | 4/2010 | Nakase | H04N 1/00204 |
| | | | 348/231.2 |
| 2012/0002726 A1* | 1/2012 | Wu | H04N 19/33 |
| | | | 375/240.15 |
| 2012/0272173 A1* | 10/2012 | Grossman | G06Q 10/103 |
| | | | 715/772 |
| 2013/0028538 A1* | 1/2013 | Simske | 382/300 |
| 2013/0064472 A1 | 3/2013 | Zhang et al. | |
| 2013/0148860 A1* | 6/2013 | Musatenko | G06K 9/6206 |
| | | | 382/107 |
| 2013/0272621 A1* | 10/2013 | Lasserre | G06T 9/00 |
| | | | 382/233 |
| 2014/0079330 A1 | 3/2014 | Zuo et al. | |
| 2014/0219346 A1 | 8/2014 | Ugur et al. | |
| 2015/0213625 A1* | 7/2015 | Berger | G06T 11/00 |
| | | | 382/302 |

* cited by examiner

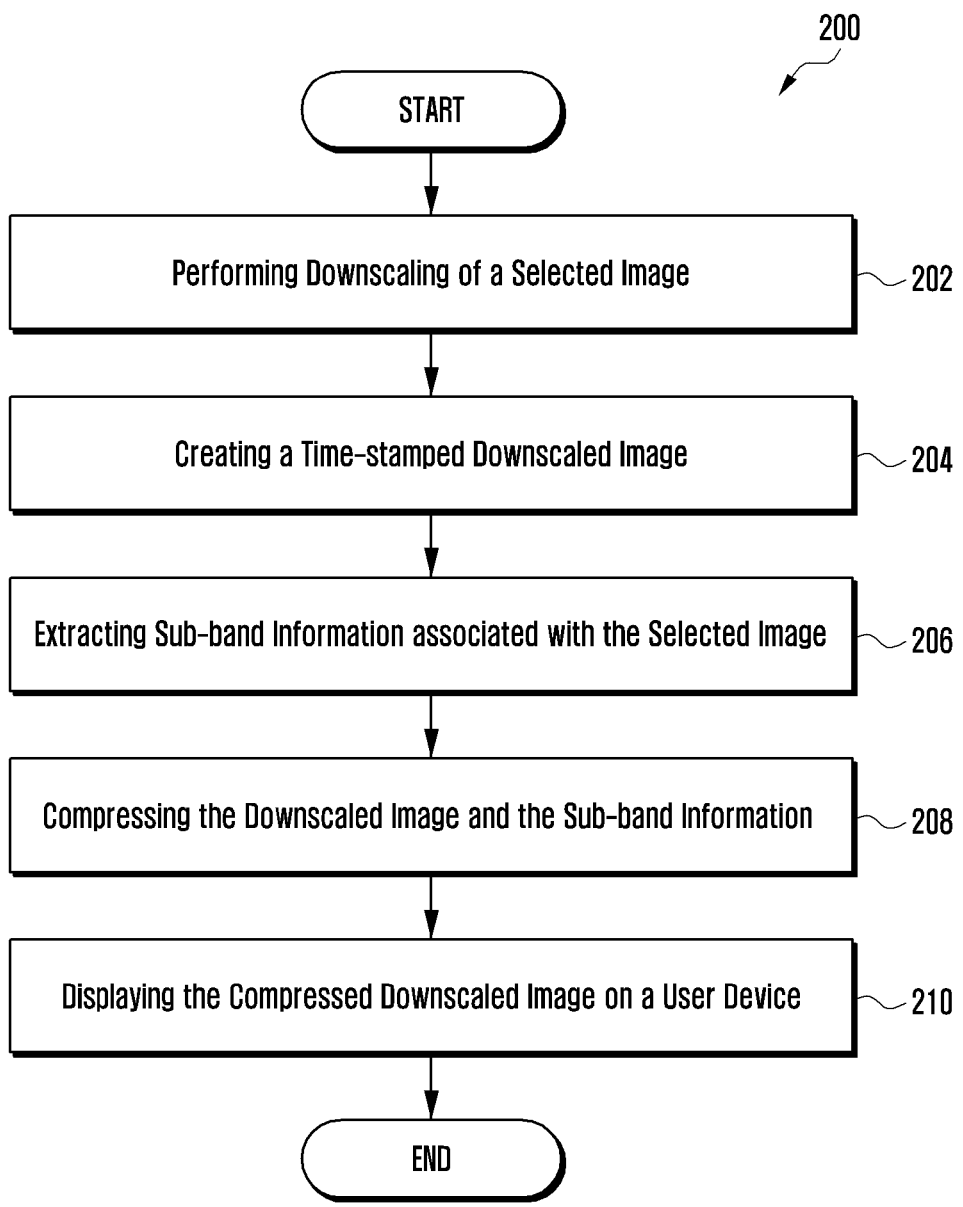

METHOD AND APPARATUS FOR STORING, PROCESSING AND RECONSTRUCTING FULL RESOLUTION IMAGE OUT OF SUB BAND ENCODED IMAGES

CROSS-REFERENCE TO RELATED APPLICATION(S)

This application claims the benefit under 35 U.S.C. § 119(a) of an Indian provisional patent application filed on Oct. 17, 2014 in the Indian Intellectual Property Office and assigned Serial number 5205/CHE/2014, and of an Indian non-provisional patent application filed on Sep. 30, 2015 in the Indian Intellectual Property Office and assigned Serial number 5205/CHE/2014, the entire disclosure of each of which is hereby incorporated by reference.

TECHNICAL FIELD

The present disclosure relates to image processing and image reconstruction methods and systems. More particularly, the present disclosure relates to a method and apparatus for storing, processing and reconstructing high resolution image out of sub-band information associated with the captured images.

BACKGROUND

A wide range of electronic devices, including mobile wireless communication devices, personal digital assistants (PDAs), laptop computers, desktop computers, digital cameras, digital recording devices, and the like, have an assortment of image and video display capabilities. Some of the electronic devices are capable of displaying two-dimensional (2D) images and video, three-dimensional (3D) images and video, or both.

Most of the time before capture of an image, a previewing process happens. Currently, even during the preview process, processing by image signal processor (ISP) occurs on a full resolution image. In most cases, display resolution is much lower than capture resolution which means that one has to down-scale the image to view the image. The downscaling of the previewed full scale image usually happens just before display of the image to fit the display resolution, while the processing and editing of the images happen with a resolution higher than the display. This results in expending additional computational resources. In order to display the image on the display of a user equipment (UE) with lesser display resolution (such as, but not limited to, mobile phone, tablet, PDA, and the like), the image has to be downscaled. But when the same image is to be viewed on the UE with larger display (such as, but not limited to, television, larger screen, monitor, laptop, and the like), the downscaled image needs to be upscaled, in order to fit to the larger display resolution which would result in inferior image quality compared to the original image. The image is captured at one instant of time and consumed (viewed/transferred) at some other instant of time (full resolution).

FIG. 1 is a schematic diagram illustrating displaying of the captured high resolution image on a high resolution display and low resolution display, according to the related art.

Referring to FIG. 1, diagram 100 includes a high resolution image 102 of 16 MP resolution that may be previewed on a display of the UE (not shown) for preview. As the 16 MP image cannot be displayed on the display of the UE, using any of the known ISP, the high resolution image 102 may be processed to obtain downscaled image 104 of 2 MP resolution.

As a downscaled image 104 may be edited or have effects added by a user to obtain an edited image 108, a downscaled image may be used for editing. But, if the editing is done on the high resolution image to obtain the edited image 108, then the high resolution image needs to be edited, and downscaled to fit the display of the UE, thereby resulting in slower image processing.

Further, when the downscaled image 104 is to be displayed on a larger screen 110 such as a television, laptop, and the like, then the downscaled image 104 needs to be upscaled. During upscaling of the downscaled image 104 the downscaled image 104 may be extrapolated such that the upscaled image may be obtained that may fit the larger display. But, the image quality will not be same after extrapolation of the downscaled image when compared with the high resolution image 102 that was previewed.

Existing computing applications may perform image signal processing, compression and decompression of images, and upscaling and downscaling of images. But there are no systems or methods available that may store a down-scaled image using compression (e.g., JPEG) and encoded residual/edge image as part of JPEG header (e.g., JFIF).

Thus there is need for a method and system that allows the downscaled image to be processed multiple times and displayed on smaller resolution display devices. Further there is a need for a method and system which allows reconstruction of processed full resolution image with less power consumption.

More details about the proposed architecture which addresses the above mentioned shortcomings, disadvantages and problems are mentioned herein and which will be understood by reading and studying the following specification.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the abovementioned problems and/or disadvantages and to provide at least the advantages described below. Accordingly, an aspect of the present disclosure is to provide a method and apparatus for storing, processing and reconstructing a full resolution image out of sub band encoded images.

In accordance with to an aspect of the present disclosure, a method of extracting sub-band information associated with a selected image is provided. The method including creating a downscaled image by performing a downscaling of the selected image, and extracting sub-band information associated with the downscaled image by processing the downscaled image using at least one parameter at one instance in time.

In accordance with another aspect of the present disclosure, a method for rendering high resolution images based on a time-domain system is provided. The method including applying a blur filter on to a selected image to obtain a filtered image, extracting a sub-band information associated with a selected image at one instance in time by taking a difference between the selected image and the filtered image, performing downscaling the filtered image, processing the down-scaled image by an ISP and storing the related parameters, conditioning the processed downscaled image using at least one photo editing operation and storing the related parameters, compressing and storing the conditioned downscaled image and the sub-band information associated with the selected image, de-compressing the downscaled image and the sub-band information, conditioning the decompressed sub-band image, using the at least one stored processing parameter used by the downscaled image and adding the conditioned sub-band information with an extrapolated conditioned downscaled image to reconstruct a high resolution image.

In accordance with another aspect of the present disclosure, a method for rendering high resolution images based on a frequency-domain system is provided. The method including performing frequency transformation on a selected image, applying a low pass filter to obtain a low frequency data of the selected image, applying a high pass filter to obtain high frequency data of the selected image, processing the low frequency data of the selected image using at least one processing parameter, conditioning the low frequency data using photo editing operations and storing the related parameters, compressing and storing the low frequency data and the high frequency data associated with the selected image, decompressing the low frequency data and the high frequency data, conditioning the decompressed high frequency data using the at least one stored processing parameter, adding conditioned low frequency data and conditioned high frequency data to get a full frequency spectrum conditioned data and applying inverse frequency transformation to reconstruct a high resolution image.

In accordance with another aspect of the present disclosure, a method for rendering a high resolution images based on a closed loop system is provided. The method including creating a downscaled image by performing a downscaling of a selected image, performing an upscaling of the downscaled image, extracting a sub-band information associated with the selected image by taking a difference between the upscaled image and the selected image, conditioning the down-scaled image by an ISP and storing the processing parameters, processing the conditioned downscaled image using at least one photo-editing operation and storing the related parameters, compressing and storing the downscaled image and the sub-band information, associated with the selected image, de-compressing the downscaled image and the sub-band information, conditioning the decompressed sub-band image, using the stored processing parameters used by the downscaled image and adding the conditioned sub-band information with an extrapolated conditioned downscaled image to reconstruct a high resolution image.

In accordance with another aspect of the present disclosure, a method of rendering a low resolution image is provided. The method including decompressing a copy of a downscaled image while retaining the downscaled image in a file container, and conditioning the downscaled data using at least one of a color conversion, resizing, rotation and blending or rendering the downscaled image to the display.

In accordance with another aspect of the present disclosure, an apparatus for extracting sub-band information associated with a selected image is provided. The apparatus including a downscaler configured to downscale the selected image, an image processing unit configured to create a time-stamped downscaled image, and extract sub-band information associated with the downscaled image by processing the downscaled image using at least one parameter at one instance in time, an encoding unit configured to compress and encode the sub-band information associated with the downscaled image and a storage unit configured to store the compressed and encoded sub-band information as a single container file format.

In accordance with another aspect of the present disclosure, an apparatus for rendering high resolution images based on a time-domain method is provided. The apparatus including a blur filter configured to obtain a filtered image from a selected image, an image extractor configured to extract a sub-band information associated with the selected image at one instance in time by taking a difference between the selected image and the filtered image, a down scaler configured to downscale the filtered image, an ISP configured to processing the down-scaled image and store the related parameters, an image conditioner configured to condition the processed downscaled image using at least one photo editing operation and store the related parameters, compress and store the conditioned downscaled image and the sub-band information associated with the selected image, de-compress the downscaled image and the sub-band information, and conditioning the decompressed sub-band image, using the at least one stored processing parameter used by the downscaled image, and an adder module adapted for configured to adding the conditioned sub-band information with an extrapolated conditioned downscaled image to reconstruct the a high resolution image.

In accordance with another aspect of the present disclosure, an apparatus for rendering high resolution images based on a frequency-domain method is provided. The apparatus including at least one processing module configured to perform frequency transformation on a selected image, apply a low pass filter to obtain a low frequency data of the selected image, apply a high pass filter to obtain high frequency data of the selected image, process the low frequency data of the selected image using at least one processing parameter, condition the low frequency data using photo editing operations and store the related parameters, compress and store the low frequency data and the high frequency data associated with the selected image, and decompress the low frequency data and the high frequency data, condition the decompressed high frequency data using the at least one stored processing parameter, adding conditioned low frequency data and conditioned high frequency data to get a full frequency spectrum conditioned data, and apply inverse frequency transformation to reconstruct the a high resolution image.

In accordance with another aspect of the present disclosure, an apparatus for rendering high resolution images based on a closed loop method is provided. The apparatus including at least one processing module configured to create a downscaled image by performing a downscaling of a selected image, perform an upscaling of the downscaled image, extract a sub-band information associated with the selected image by taking a difference between the upscaled image and the selected image, condition the down-scaled image by an ISP and store the processing parameters, process the conditioned downscaled image using at least one photo-editing operation and store the related parameters, compress and store, the downscaled image and the sub-band information, associated with the selected image, de-compress the downscaled image and the sub-band information, condition the decompressed sub-band image using the stored processing parameters used by the downscaled image, and add the conditioned sub-band information with an extrapolated conditioned downscaled image to reconstruct the high resolution image.

In accordance with another aspect of the present disclosure, an apparatus for rendering a low resolution image is provided. The apparatus including at least one module configured to decompress a copy of a downscaled image without removing the downscaled image from a file container, condition the downscaled data using at least one of a color conversion, resizing, rotation or blending, and render the downscaled image to a display. The low resolution image is independent of sub-band information and related processing parameters.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 is a schematic flow diagram illustrating a method for storing, processing and reconstructing a full resolution image out of sub band encoded images, according to an embodiment of the present disclosure.

Throughout the drawings, it should be noted that like reference numbers are used to depict the same or similar elements, features, and structures.

DETAILED DESCRIPTION

Figure 1:
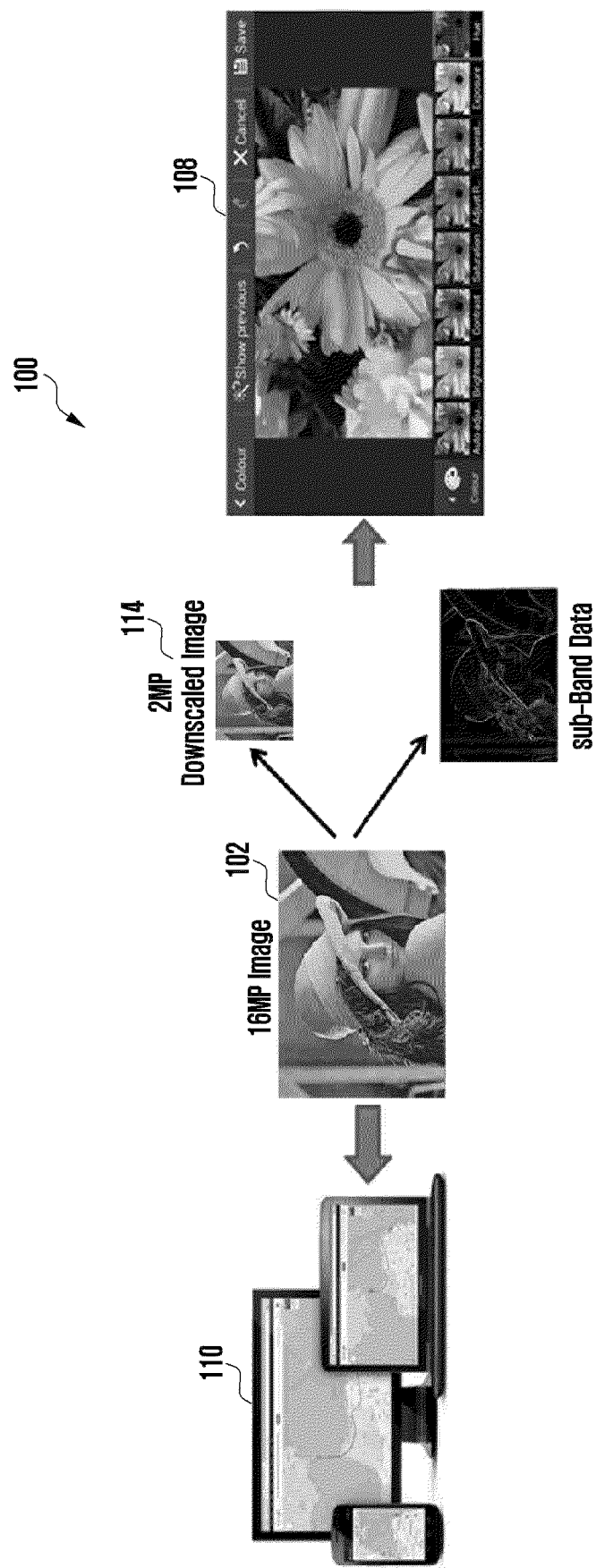
FIG. 1 is a schematic diagram illustrating displaying of a captured high resolution image on a high resolution display unit and a low resolution display unit, according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

It will be further understood that the terms "includes", "comprises", "including" and/or "comprising" when used in this specification, specify the presence of stated features, integers, operations, elements and/or components, but do not preclude the presence or addition of one or more other features integers, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure discloses a method and system for rendering high resolution images based on sub-band encoded data of an image. The present disclosure is described with help of various embodiments. The person of ordinarily skill in the art will understand that implement actions of the present disclosure may be modified to achieve the objective of the present disclosure without departing from the scope of the disclosure.

According to an embodiment of the present disclosure, a method for rendering high resolution images based on sub-band encoded data of an image is described herein. The method comprises operations of performing downscaling of a selected image. According to the present method, an image may be received by a user equipment (UE). In an embodiment of the present disclosure, the selected image may be a preview image that is of high resolution. In another embodiment of the present disclosure, the selected image may be any of high resolution images that may include, but not limited to, a captured image from the UE, an image received from another UE, or any other image stored in any of the storage device. According to the present embodiment, the selected image may be image under review at the UE before capture, but the person ordinarily skilled in the art may understand that the selected image may be any of the abovementioned image, without departing from the scope of the disclosure.

The selected image may be downscaled so that a downscaled image is obtained for the selected image. The person of ordinarily skill in the art may understand that any downscaler may be used for downscaling the selected image, without departing from the scope of the disclosure.

The method further comprises an operation of creating a time-stamped downscaled image. As user of the UE is attempting to capture an image, and there may be selected images at different time instances, the downscaler may create downscaled images to fit on the screen of the UE at that particular time instance and the image may be called as time-stamped downscaled image. In an embodiment of the present disclosure, the UE may generate only one time-stamped downscaled image. In another embodiment of the present disclosure, the UE may generate a plurality of down-stamped downscaled images so that the user may select the best image among them. In another embodiment of the present disclosure, the UE may generate a continuous burst of time-stamped downscaled images. The person having ordinarily skilled in the art may understand that different image capturing methods may be used to capture and create time-stamped downscaled image, without departing from the scope of the disclosure.

Further, the method comprises an operation of extracting sub-band information associated with the selected image at one instance in time. For the selected image, the associated sub-band information may be extracted, wherein the sub-band information is residue of the selected image after creating time-stamped downscaled image. The sub-band information comprises pixel data and other data related to the time-stamped downscaled image after extracting from the selected image.

In an embodiment of the present disclosure, the sub-band information corresponding to the selected image may be derived using at least one of, but not limited to, time-domain method, frequency-domain method, closed loop system, and the like. The method for deriving the sub-band information may be described later in the description with respect to corresponding figures.

Further, the method comprises compressing the downscaled image and the sub-band information. Upon extracting the sub-band information, both the downscaled image and sub-band information may be compressed. In an embodiment of the present disclosure, the sub-band information may be compressed based on pre-computed weighted quantization values. In an embodiment of the present disclosure, any known image compression method may be used for compressing the image, without departing from the scope of the disclosure. In an embodiment of the present disclosure, the compressed image may be an extrapolated compressed image.

In another embodiment of the present disclosure, the sub-band information and the time-stamped downscaled image may be stored in the UE for future reference or use. In an embodiment of the present disclosure, the sub-band information and the time-stamped downscaled image may be stored in the same order as the sub-band information and the time-stamped downscaled image are received during preview, at different time intervals, without departing from the scope of the disclosure. In an embodiment of the present disclosure, the storage module in which the time-stamped downscaled image and the corresponding sub-band information stored may include, but not limited to, internal storage of the UE, random access memory (RAM), external storage devices such as, but not limited to, memory card, pen drive, hard disk, storage module of another device or UE, server, cloud database, and the like, and the person ordinarily skill in the art will understand that the time-stamped downscaled image and the corresponding sub-band information may be stored in any of the known storage modules, without departing from the scope of the disclosure.

Further, the method comprises an operations of decompressing and adding the sub-band information with extrapolated downscaled image to reconstruct and render high resolution image. During reconstruction of the compressed image, the extrapolated downscaled image and the sub-band information may be accessed, decompressed and reconstructed to render back the high resolution image.

In another embodiment of the present disclosure, compressed downscaled image may be displayed on a user device. Upon compressing the image, the time-stamped downscaled image of the selected image may be displayed on the user device. The time-stamped downscaled image may be decompressed along with the sub-band information, reconstructed and displayed only as a preview image to the user so that the user may understand that the image that user is trying to capture will be displayed as such.

In an embodiment of the present disclosure, the downscaled image may be processed independently of the sub-band information, using one or more processing parameters comprising of, but not limited to, a filter size, filter coefficients, intensity gains, color gains or any other linear or non-linear digital signal processing parameters, and the like. In another embodiment of the present disclosure, one or more parameters used for processing the downscaled information may be stored in the same order as of the processing along with the compressed downscaled image. In another embodiment of the present disclosure, the downscaled image may be decompressed for further processing, independent of the sub-band information.

Further, in an embodiment of the present disclosure, the method further comprises de-compressing the downscaled image and the side band information. The downscaled image may be previewed on the display of the UE. But, to maintain the consistency of the image and resolution quality, the downscaled image may be decompressed. Also, the side band information corresponding to the downscaled image may also be de-compressed.

Further, the method comprises processing the decompressed side band information using one or more processing parameters. In an embodiment of the present disclosure, the one or more processing parameters associated with the decompression of the side band information may include at least one of, but not limited to, a filter size, filter coefficients, intensity gains, color gains, any other linear or non-linear digital signal processing parameters, and the like. In an embodiment of the present disclosure, one or more parameters used for processing the sub-band information may be stored in a same order as of the processing.

Further, the method comprises reconstructing a high resolution image of the selected image by adding the extrapolated downscaled image and the processed sub-band information associated with the selected image. The downscaled image and the corresponding sub-band information may be added to an adder, wherein the adder identifies the image information related to each pixel, and combines both of the downscaled image and the sub-band information to reconstruct the high resolution image. In an embodiment of the present disclosure, the one or more parameters may also be applied to the sub-band information in the same order as the one or more parameters are stored before the reconstruction of the high resolution image.

In another embodiment of the present disclosure, the method further comprises encoding the sub-band information associated with the selected image. According to the present disclosure, any known encoding method may be used for encoding the sub band information corresponding to the downscaled image, without departing from the scope of the disclosure.

Further, the downscaled image and the corresponding encoded sub-band information may be stored in a compressed single data container format. In an embodiment of the present disclosure, the sub-band image is compressed, encoded and stored as part of a header of an image file format. In an embodiment of the present disclosure, the image file format may be one of known image formats that includes, but not limited to, JPEG, GIF, PNG, TIF, and the like.

In another embodiment of the present disclosure, the downscaled image and the corresponding compressed encoded sub-band information may be stored in compressed separate containers with same file format. The downscaled image and the corresponding compressed encoded sub-band information may also store the location information so that when the downscaled image is accessed for reconstruction, the corresponding compressed encoded sub-band information may also be obtained easily. In another embodiment of the present disclosure, the downscaled image and the corresponding compressed encoded sub-band information may be stored in compressed separate containers with different file formats. The person ordinarily skill in the art may understand that various data storing methods may be used to store the downscaled image and the corresponding compressed encoded sub-band information, without departing from the scope of the disclosure.

In another embodiment of the present disclosure, the method further comprises allowing independent modification to the downscaled image. The downscaled image of the selected image may be accessed from the storage module, and only the downscaled image may be accessed without accessing the sub-band information. The accessed downscaled image may be modified independently, without modifying the sub-band information.

Further, the method comprises storing the one or more processing parameters for post processing of the sub-band image. The processing parameters associated with each of the downscaled image and the corresponding sub-band information may be retained, so that the one or more processing parameters may be used during post processing of the sub-band image to reconstruct the high resolution image.

Various embodiments disclosed in the present disclosure may be performed by electronic device. The electronic device may include user devices (for example, wireless mobile communication device, PDA (Personal Digital Assistant), laptop computer, desktop computer, digital camera, digital recorder, and so on) and server apparatus.

According to various embodiments, an input image "x" may be an image acquired by a camera sensor provided on the user device and/or acquired by external device connected with the user device by wire/wireless communication and transmitted to the electronic device by real time.

According to another embodiment, the various embodiments disclosed in the present disclosure may be performed by server apparatus connected with various electronic devices. The server apparatus may be receive high resolution image required by the various electronic device through the network, and may downscale, compress, store, decompress and add the image using methods described in the present disclosure.

FIG. 2 is a schematic flow diagram illustrating a method for rendering high resolution images based on sub-band encoded data of an image, according to an embodiment of the present disclosure.

Referring to FIG. 2, in the method 200, at operation 202 perform downscaling of a selected image. The selected image may be a preview image on a display of UE, which is actually a high resolution image. The selected image may be downscaled to match the display capability of the display of the UE.

Further, at operation 204, create a time-stamped downscaled image. Based on the time duration of the preview, the time-stamped downscaled image may be created. The time duration of the preview may be defined as elapsed time from certain time (for example, start time of display of the preview). At operation 206, extract sub-band information associated with the selected image, wherein the sub-band information may be residue data related corresponding to the selected image, after obtaining the time-stamped downscaled image after downscaling of the selected image. Further, at operation 208, compress the downscaled image and the sub-band information. Both the downscaled image and the corresponding sub-band information may be compressed. The compressed downscaled image and the corresponding sub-band information may be stored for future use. At operation 210, display the compressed downscaled image on a user device. The compressed image may be displayed on the UE as a preview image, which user may retain it or move to another image for capturing and saving.

Figure 3A:
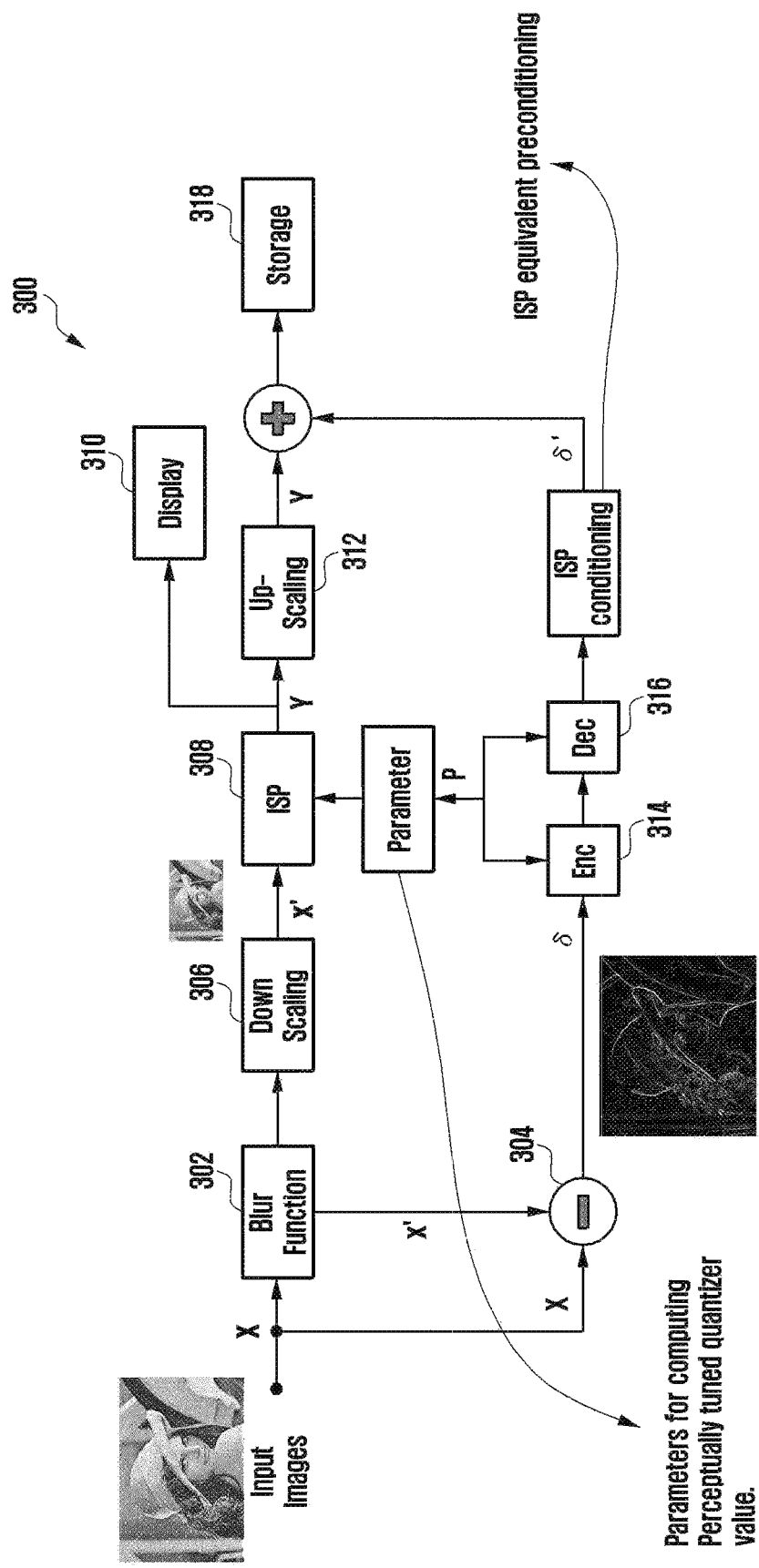
FIG. 3A is a schematic diagram illustrating a method for storing, processing and reconstructing a full resolution image out of sub band encoded images using a time domain, according to an embodiment of the present disclosure.

FIG. 3A is a schematic diagram illustrating a method for storing, processing and reconstructing a full resolution image out of sub band encoded images using a time domain, according to an embodiment of the present disclosure.

Referring to FIG. 3A, in a system 300, a high resolution image obtained during preview may be downscaled, compressed, stored, decompressed, and added to in order to obtain the high resolution image back during storing based on a time factor of the image.

According to FIG. 3A, an input image x may be received during preview. The input image x may be transmitted to a blur function module 302, wherein the noise present in the image may be removed to obtain filtered image x'. Any of the known noise removal method and any type of noise present in the image may be removed using the blur function 302 to obtain the filtered image X', without departing from the scope of the disclosure. A subtractor 304 may acquire sub-band information δ based on the input image x and filtered image x'. In other words, the input image x may be substituted at the subtractor 304 with the filtered image x' to obtain sub-band information δ.

Further, the filtered image X' may be transmitted to a downscaler 306 to obtain downscaled image x', wherein the image may be downscaled such that the image may match the display resolution of the UE. Further, the downscaled image x' may be transmitted to an image signal processor (ISP) 308, wherein the ISP 308 may process the downscaled image to obtain a processed image y. The ISP 308 may also obtain the one or more parameters P while processing the downscaled image x'. The parameter P may include at least one of a filter size, filter coefficients, intensity gains, color gains or any other linear or non-linear digital signal processing parameters, and the like.

Further, the processed image y may be displayed on a display 310 of the UE. Further, the processed image y may be upscaled at an upscaler 312 to obtain an upscaled image Y. The sub-band information δ may be encoded at an encoder 314, and the encoded sub-band information may be decompressed at a decompressor 316, wherein parameters P may be considered while encoding and decompressing the sub-band information δ. The decompressed image may be conditioned at ISP conditioning module to obtain conditioned sub-band information δ'. The ISP conditioning of the sub-band information δ is equivalent to preconditioning of the ISP 308. The conditioned sub-band information δ' and the upscaled image Y may be added together and stored in a storage module 318.

The abovementioned process receives the downscaled image which is time stamped and performs processing on the time stamped downscaled image. The time domain based sub-band information processing method helps in reducing the aliasing effects in the downscaled image, and also helps in improving quality of the downscaled image.

Figure 3B:
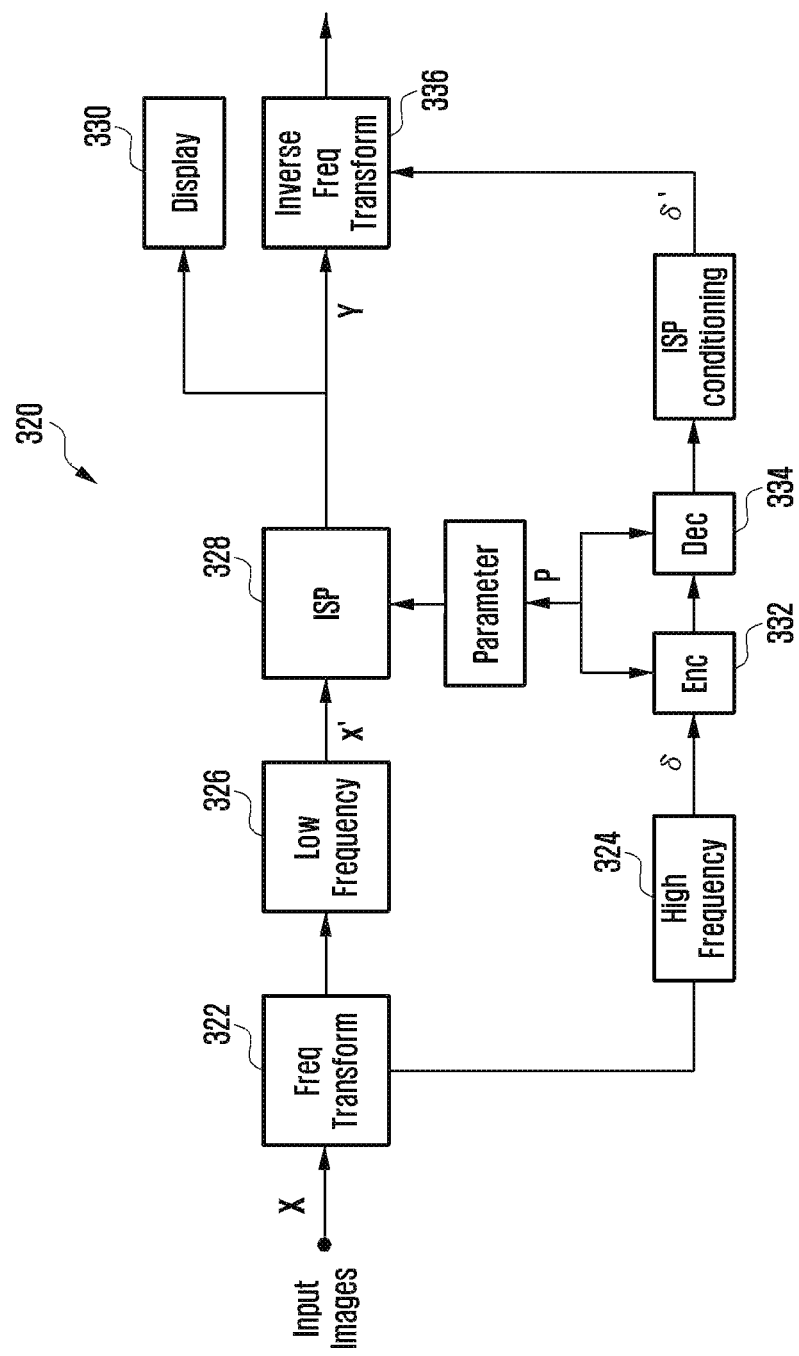
FIG. 3B is a schematic diagram illustrating a method for storing, processing and reconstructing a full resolution image out of sub band encoded images using a frequency domain, according to an embodiment of the present disclosure.

FIG. 3B is a schematic diagram illustrating a method for storing, processing and reconstructing a full resolution image out of sub band encoded images using frequency domain, according to an embodiment of the present disclosure.

Referring to FIG. 3B, in a system 320 a high resolution image obtained during preview may be downscaled, compressed, stored, decompressed, and added to in order to obtain the high resolution image back during storing based on a time factor of the image.

According to FIG. 3B, an input image x may be received during preview. The input image x may be transmitted to a frequency transformer 322, wherein the frequency transformer 322 transforms the image data into frequency data of the image x. The frequency data of the image x may be transmitted to a high frequency modulator 324, wherein the frequency of the image x may be modulated to high frequency data δ.

Further, the frequency data of the image x may also be transmitted to a low frequency modulator 326, wherein the frequency of the image x may be modulated to low frequency data x'. Further, the low frequency image data x' may be transmitted to an ISP 328. The ISP 328 may process the low frequency data of the image x' to obtain a processed image y. The ISP 328 may also obtain the one or more parameters P while processing the low frequency image data x'. The parameters P obtained during processing of the image are described herein above, and hence not described herein again to avoid repetition.

Further, the processed image y may be displayed on a display 330 of the UE. The high frequency image data δ may be encoded at an encoder 332, and the encoded high frequency image data δ may be decompressed at a decompressor 334, wherein parameters P may be considered while encoding and decompressing the high frequency image data δ. The decompressed high frequency image data may be conditioned at an ISP conditioning module to obtain conditioned high frequency image data δ'. The ISP conditioning of the high frequency image data δ is equivalent to preconditioning of the ISP 328. Further, the processed image y may be transformed at an inverse frequency transformer 336 by adding the high frequency image data δ' to obtain a high resolution image data and high resolution image data may be stored in a storage module 336.

Figure 3C:
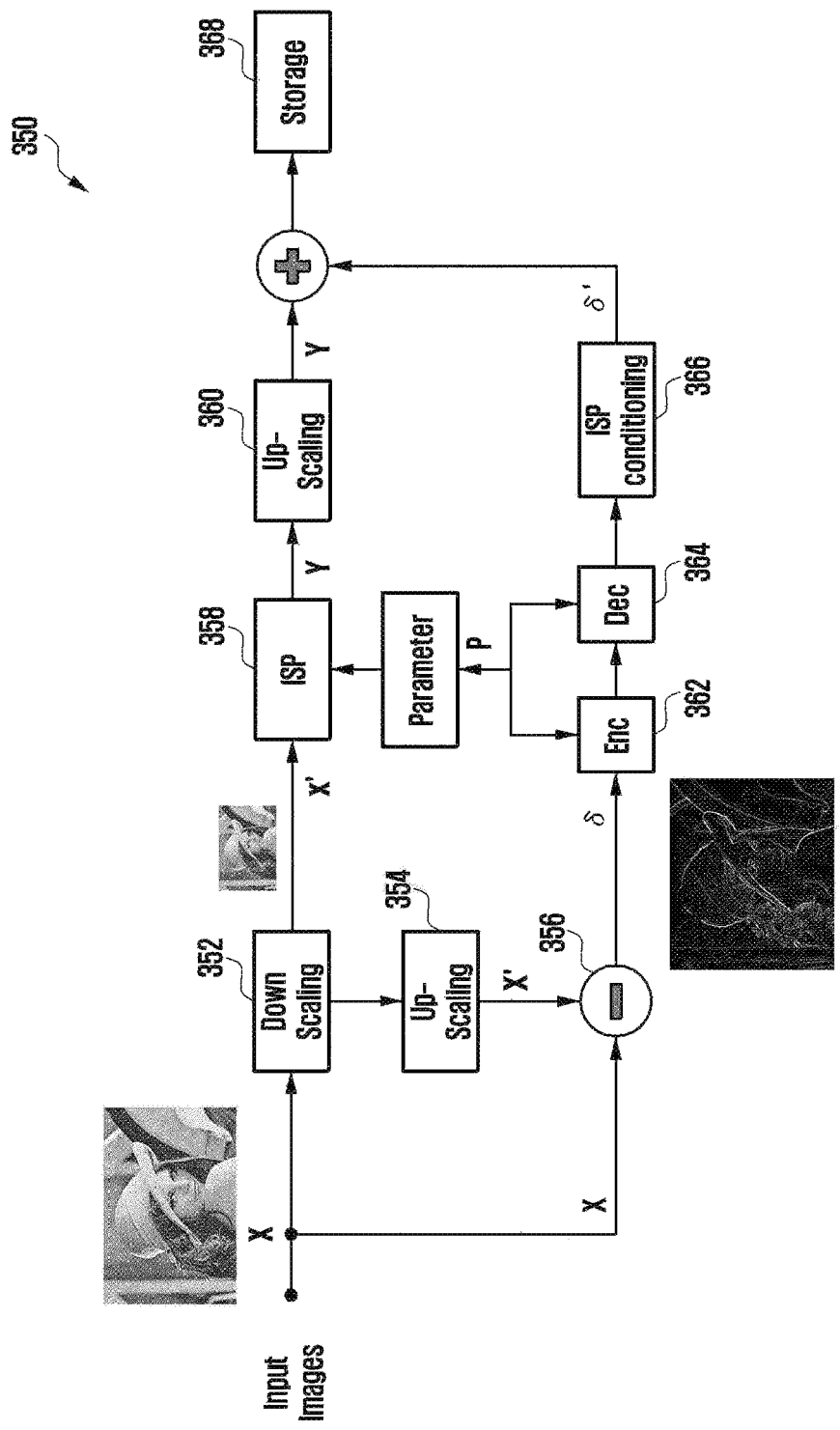
FIG. 3C is a schematic diagram illustrating a method for storing, processing and reconstructing a full resolution image out of sub band encoded images using a closed loop system, according to an embodiment of the present disclosure.

FIG. 3C is a schematic diagram illustrating a method for storing, processing and reconstructing full resolution image out of sub band encoded images using a closed loop system, according to an embodiment of the present disclosure.

Referring to FIG. 3C, in a system 350 a high resolution image obtained during preview may be downscaled, compressed, stored, decompressed, and added to in order to obtain the high resolution image back during storing based on closed loop system.

According to FIG. 3C, an input image x may be received during preview. The input image X may be transmitted to a downscaler 352 to obtain downscaled image x', wherein the image may be downscaled such that the image may match the display resolution of the UE. The downscaled image x' may be upscaled using an upscaler 354 to obtain an upscaled image X'. A subtractor 356 may acquire sub-band information δ based on the input image X and upscaled image X'. In other words, the input image X may be substituted at a subtractor 356 with the upscaled image X' to obtain sub-band information δ.

Further, the downscaled image x' may be transmitted to an ISP 358, wherein the ISP 358 may process the downscaled image x' to obtain a processed image y. The ISP 358 may also obtain the one or more parameters P while processing the downscaled image x'. The parameters P obtained during processing of the image are described herein above, and hence not described herein again to avoid repetition.

Further, the processed image y may be upscaled at an upscaler 360 to obtain an upscaled image Y. The sub-band information δ may be encoded at an encoder 362, and the encoded sub-band information may be decompressed at a decompressor 364, wherein parameters P may be considered while encoding and decompressing the sub-band information δ. The decompressed image may be conditioned at ISP conditioning module 366 to obtain conditioned sub-band information δ'. The ISP conditioning of the sub-band information δ is equivalent to preconditioning of the ISP 358. The conditioned sub-band information δ' and the upscaled image Y may be added together 370 and stored in a storage module 368.

The abovementioned process for closed loop system is one of the suitable methods as the abovementioned process replicates the exact process of upscaling during the reconstruction of full resolution image. Further, the losses are controlled in the closed loop system and hence better tuning capabilities may be provided in the system for making the right trade-offs.

Figure 4:
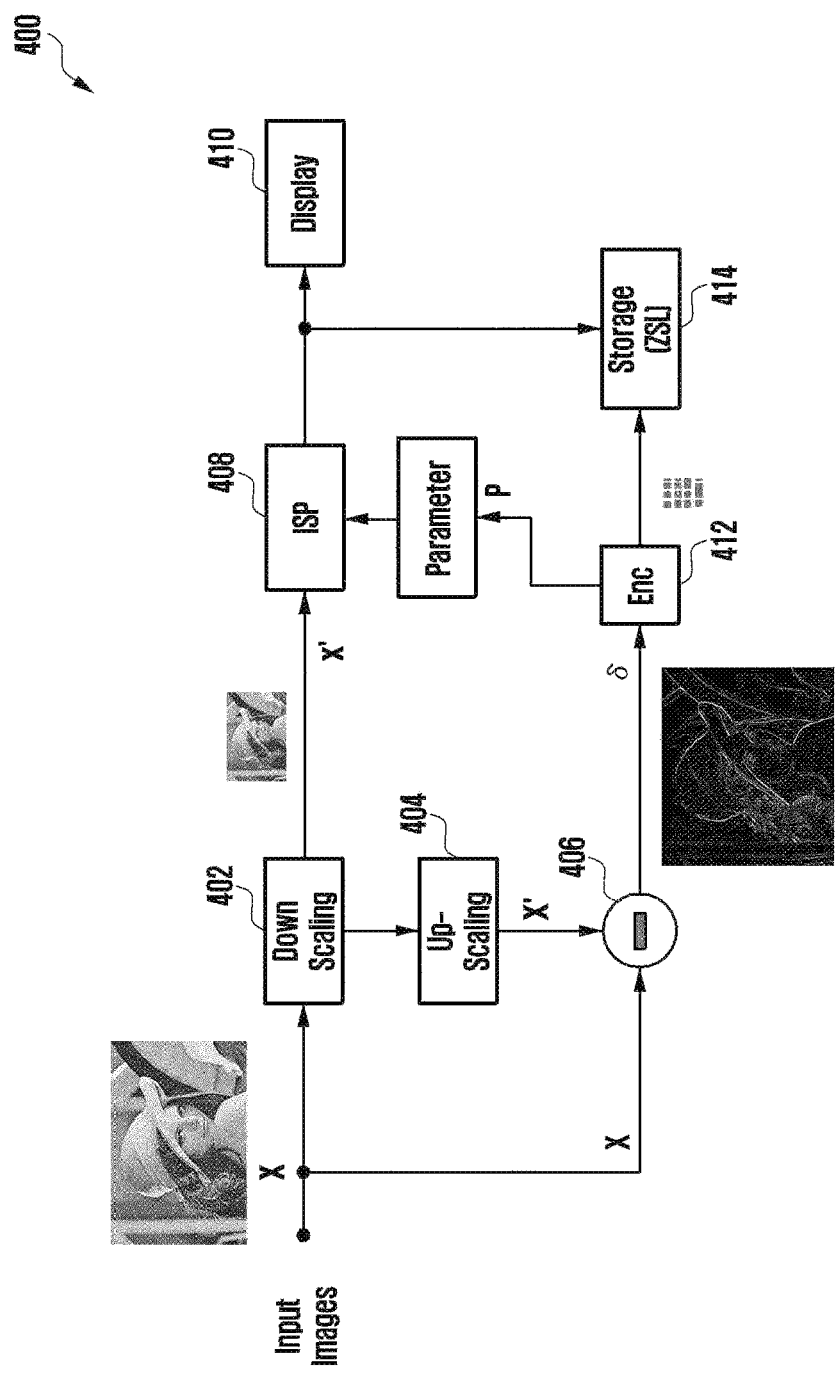
FIG. 4 is a schematic diagram illustrating a camera live preview operation, according to an embodiment of the present disclosure.

FIG. 4 is a schematic diagram illustrating a camera live preview operation, according to an embodiment of the present disclosure.

Referring to FIG. 4, in a system 400 an input image X may be received during preview. The input image X may be transmitted to a downscaler 402 to obtain downscaled image x', wherein the image may be downscaled such that the image may match the display resolution of the UE. The downscaled image x' may be upscaled using an upscaler 404 to obtain an upscaled image X'. A subtractor 406 may acquire sub-band information δ based on the input image X and upscaled image X'. In other words, the input image X may be substituted at a subtractor 406 with the upscaled image X' to obtain sub-band information δ.

Further, the downscaled image x' may be transmitted to an ISP 408, wherein the ISP 408 may process the downscaled image x' to obtain a processed image y. The ISP 358 may also obtain the one or more parameters P while processing the downscaled image x'. The parameters P obtained during processing of the image are described herein above, and hence not described herein again to avoid repetition.

Further, the processed image y may be displayed on a display 410 of the UE. The sub-band information δ may be encoded at an encoder 412 to obtain encoded sub-band information, wherein parameters P may be considered while encoding the sub-band information δ. The encoded sub-band information and processed image y may be stored in a storage module 414, wherein the storage module 414 may be a zero shutter lag (ZSL) storage, and the person having ordinarily skilled in the art may understand the ZSL storage, and hence not described in detail.

According to the present disclosure, at different timestamps, a plurality of high resolution image previews may be captured and selected. For the selected images, time stamp information, indicating timing information at which the image is selected, may also be attached. The plurality of time-stamped images may be downscaled and subtracted with the selected image to obtain a plurality of time stamped downscaled images along with sub-band information. The plurality of time stamped downscaled images may be processed with an ISP to obtain corresponding parameters for the plurality of time stamped downscaled images. The plurality of time stamped downscaled images along with corresponding sub-band information and parameters may be stored in a ZSL buffer memory. The ZSL buffer may be a temporary memory and may delete the unwanted images once the unwanted images are rejected. If user selects any particular downscaled image at particular time-stamp, then only the particular time stamped downscaled image along with corresponding sub-band information and the parameters may be stored in a storage as a single file format.

Figure 5:
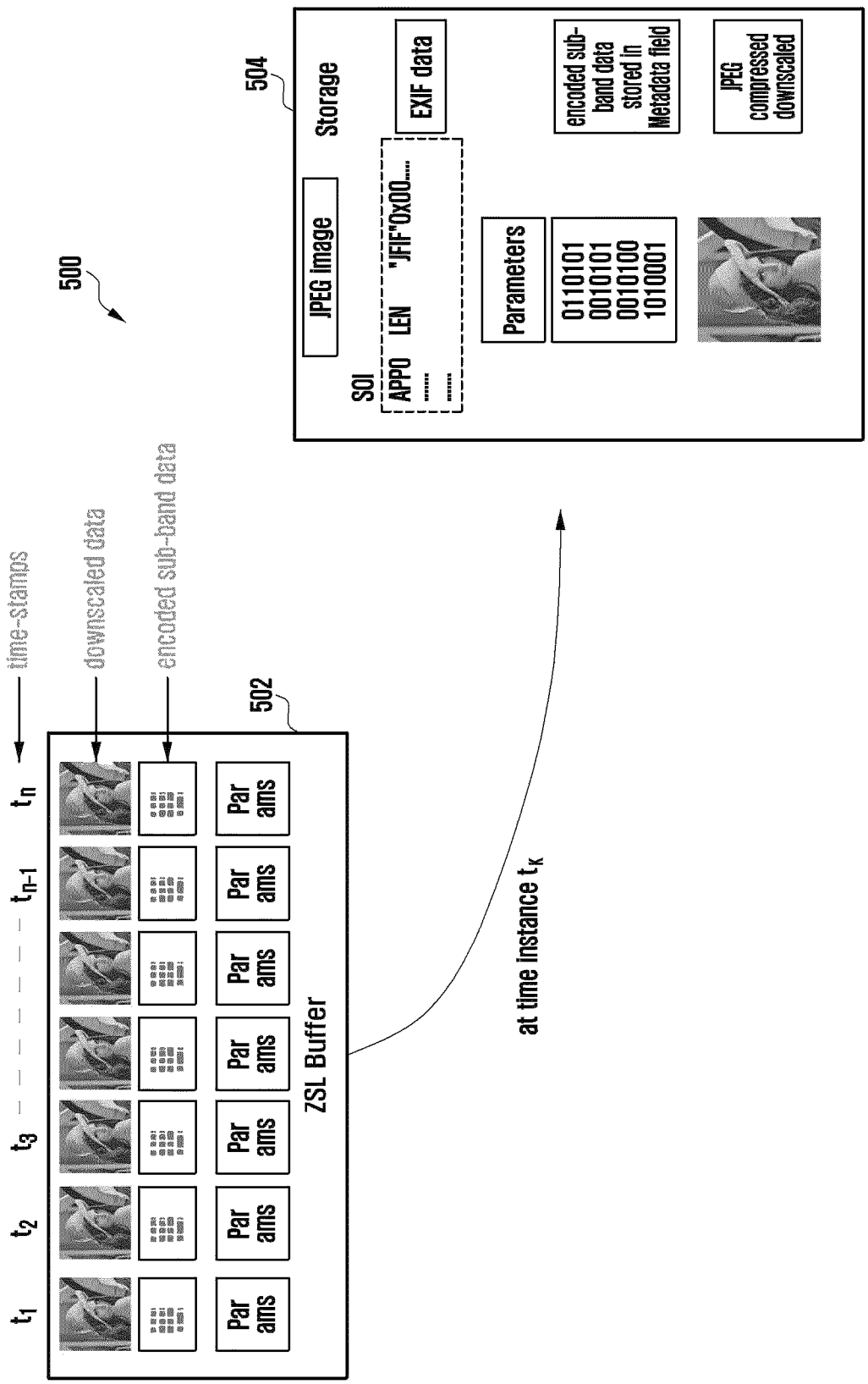
FIG. 5 is a schematic diagram illustrating a method of capturing and storing of images, according to an embodiment of the present disclosure.

FIG. 5 is a schematic diagram illustrating a method of capturing and storing of images, according to an embodiment of the present disclosure.

FIG. 5 illustrates a system 500 of obtaining or capturing plurality of downscaled images at a ZSL buffer 502 along with encoded sub-band information and parameters at different time stamps and storing the selected downscaled image along with the encoded sub-band information and parameters. As described herein above, the ZSL buffer 502 comprises of plurality of downscaled images, along with corresponding sub-band information and parameters obtained at different time stamps. When the user selects downscaled image with corresponding sub-band information and parameters at time instance tk, then only the particular downscaled image with corresponding sub-band information and parameters at time instance tk may be stored in a storage module 504 within a single file format. In the current embodiment, the file format is mentioned as JPEG image. In another embodiment of the present disclosure, the file format may be the known file format, without departing from the scope of the disclosure.

According to an embodiment of the present disclosure, the downscaled image along with encoded sub-band information and parameters may be decoded and displayed on a display of a UE during fast preview. During fast preview, the downscaled image may be obtained from a storage module and at a decoder, the downscaled image may be decoded by adding the sub-band information and the parameters to the image to obtain a fast preview image. The fast preview image may be displayed on the display of the UE.

Figure 6:
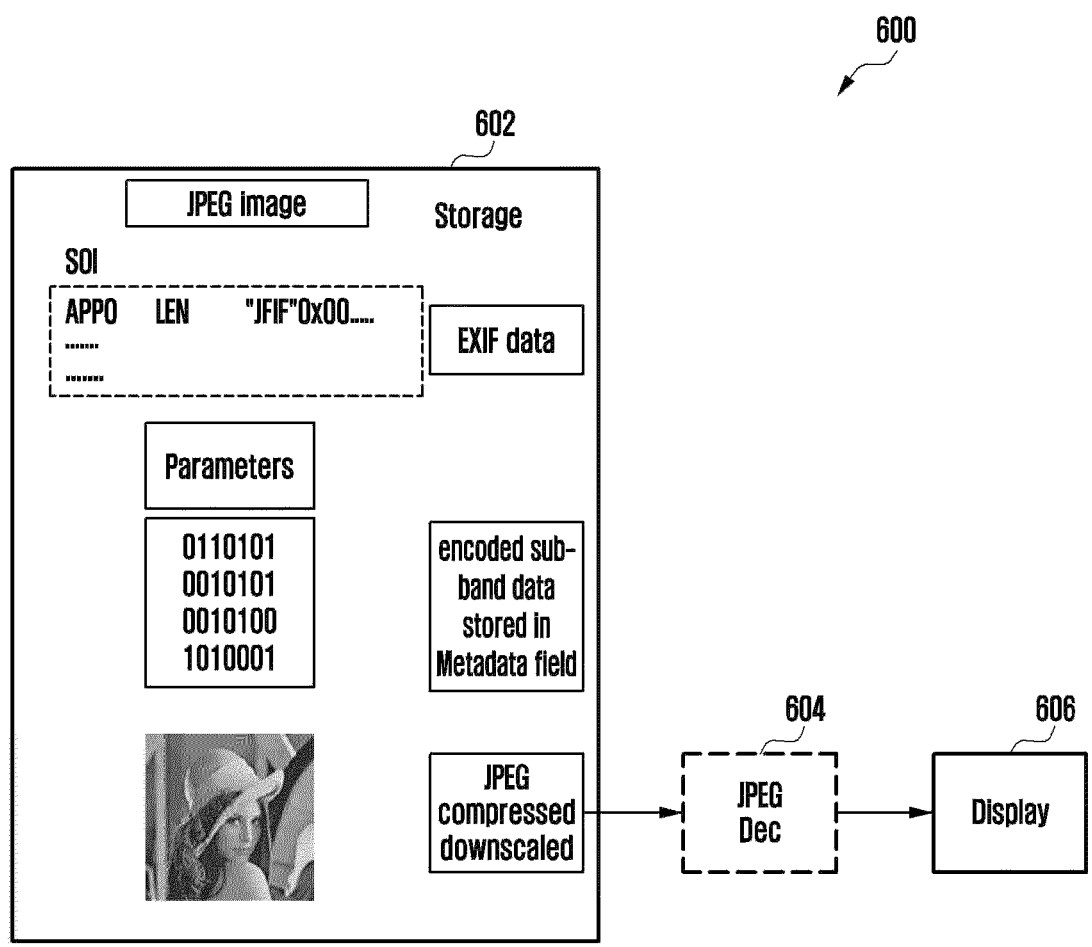
FIG. 6 is a schematic diagram illustrating a fast preview operation after capturing an image, according to an embodiment of the present disclosure.

FIG. 6 is a schematic diagram illustrating a fast preview operation after capturing an image, according to an embodiment of the present disclosure.

Referring to FIG. 6, according to a system 600, a downscaled image may be obtained from a storage module 602, along with the corresponding sub-band information and the parameters stored as a single JPEG image file format contents. The downscaled image and the corresponding sub-band information and the parameters may be decoded by a JPEG decoder 604 to obtain a decoded image. The decoded image may be displayed on display 606 of a UE as a fast preview image.

According to another embodiment of the present disclosure, the stored downscaled image may be obtained by the user during preview, and the image may be edited by the user. Before editing, the downscaled image along with the corresponding sub-band information and the parameters may be obtained from a storage module and decoded by a decoder. During editing, the user may make changes in the image by adding/modifying the parameters of the image. Upon editing, the changed parameters may also be considered and stored in the storage. Upon completion of editing, the edited image may be encoded by an encoder and the encoded image may be stored in the storage module. In an embodiment of the present disclosure, the edited image may be updated and stored in the same file. In another embodiment of the present disclosure, the edited image along with the sub-band information and the parameters may be stored as new file format content, without departing from the scope of the disclosure.

Figure 7:
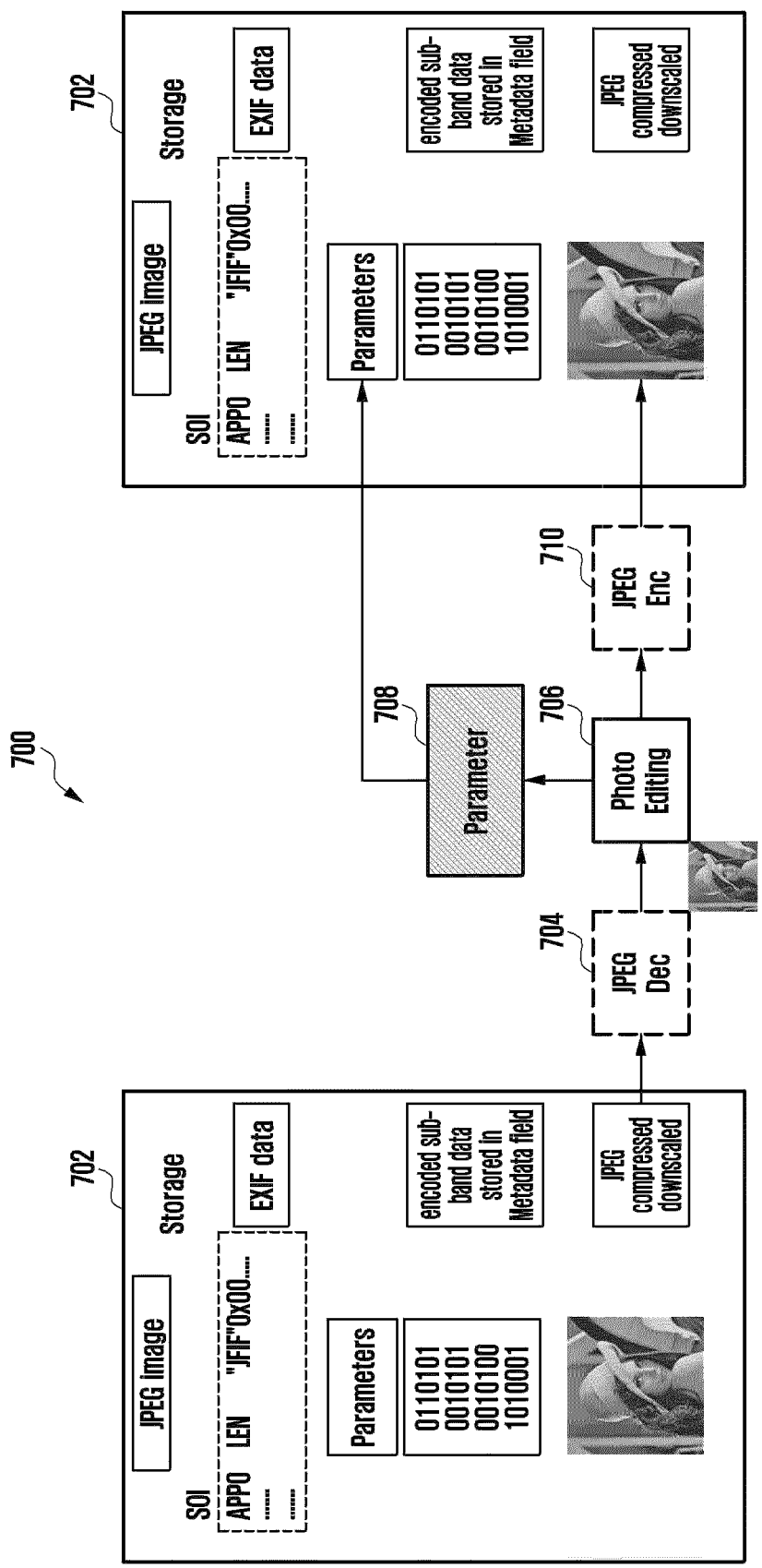
FIG. 7 is a schematic diagram illustrating an editing operation of an image after capturing the image, according to an embodiment of the present disclosure.

FIG. 7 is a schematic diagram illustrating an editing operation of an image after capturing the image, according to an embodiment of the present disclosure.

Referring to FIG. 7, in a system 700 a downscaled image may be obtained from a storage module 702, along with the corresponding sub-band information and the parameters stored as a single JPEG image file format (or another file format) contents. The downscaled image and the corresponding sub-band information and the parameters may be decoded by a JPEG decoder 704 to obtain a decoded image. The decoded downscaled image may be sent for photo editing 706. Parameters 708 of the downscaled image may be added or modified to obtain an edited image. The updated parameters 708 may be stored in the single JPEG image file format contents present in the storage module 702. The edited image is encoded by a JPEG encoder 710, wherein the JPEG encoder encodes the edited image to obtain encoded downscaled image. The encoded downscaled image may be stored in the single JPEG image file format contents present in the storage module 702 along with sub-band information and the edited parameters.

Figure 8A:
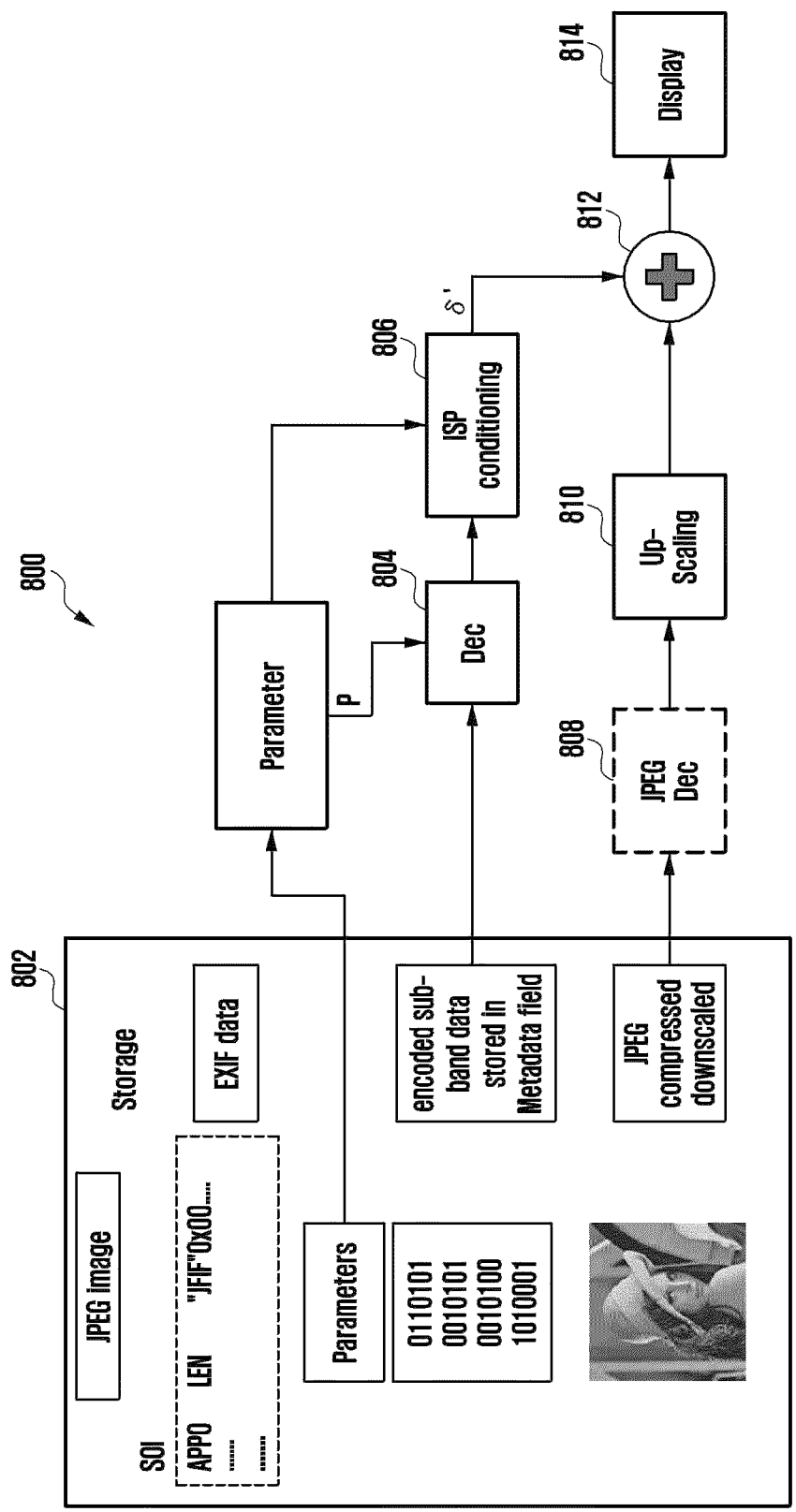
FIG. 8A is a schematic diagram illustrating a use case application for storing, processing and reconstructing a full resolution image out of sub band encoded images, according to an embodiment of the present disclosure.

FIG. 8A is a schematic diagram illustrating a use case application for storing, processing and reconstructing full resolution image out of sub band encoded images, according to an embodiment of the present disclosure.

Referring to FIG. 8A, in a system 800 encoded sub-band information along with parameters may be accessed from a single JPEG file present in a storage module 802 and the accessed encoded sub-band information and the parameters may be decoded by a decoder 804 to obtain decoded sub-band information. The decoded sub-band information may be again processed along with the parameters by an ISP 806 conditioning to obtain processed image 6'.

Further, a JPEG compressed downscaled image present in the JPEG file may be accessed and decoded 808 using JPEG decoder to obtain decoded downscaled image. The decoded downscaled image may be upscaled 810 by an upscaler to obtain upscaled image. The upscaled image and the processed image 6' may be added 812 together to obtain a high resolution image, which may be output on display 814 of a UE.

Figure 8B:
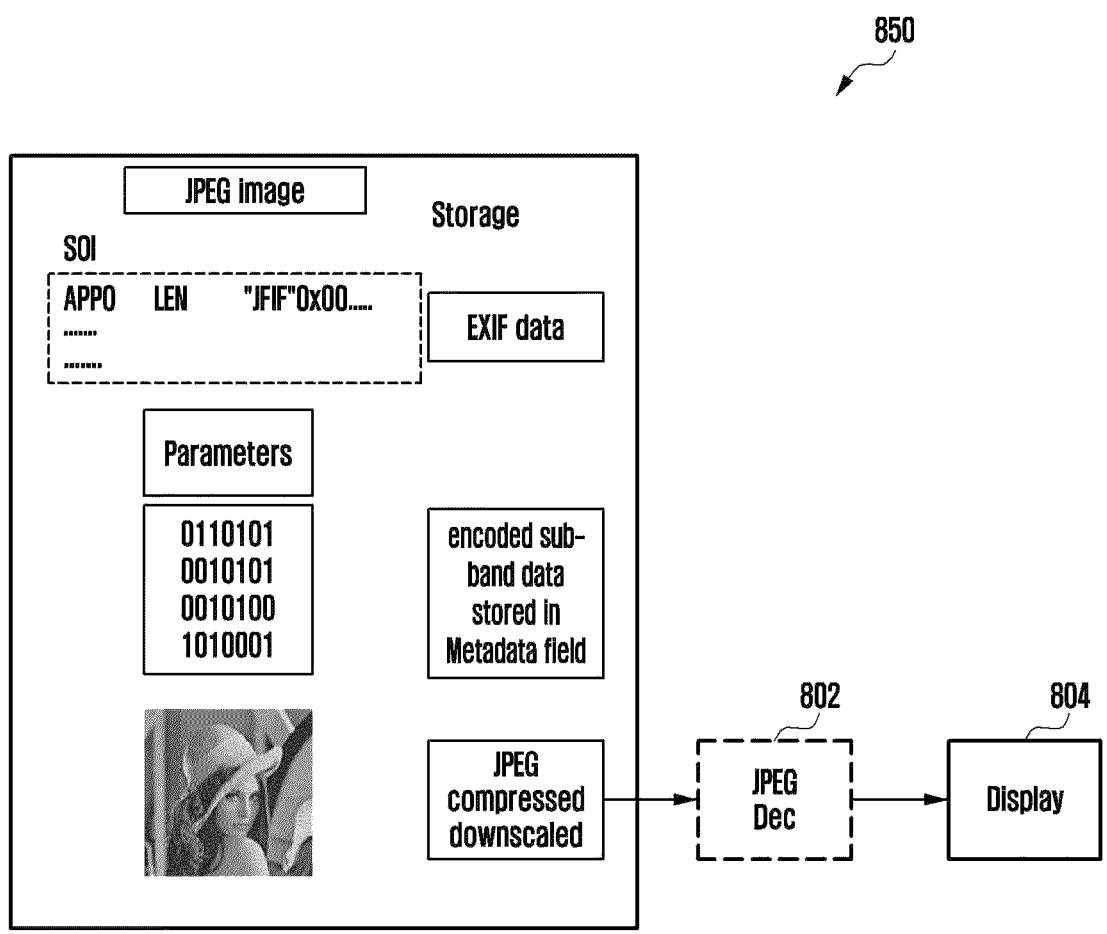
FIG. 8B is a schematic diagram illustrating another use case application for storing, processing and reconstructing a full resolution image out of sub band encoded images, according to an embodiment of the present disclosure.

FIG. 8B is a schematic diagram illustrating another use case application for storing, processing and reconstructing a full resolution image out of sub band encoded images, according to an embodiment of the present disclosure.

According to FIG. 8B, in a system 850 only JPEG compressed downscaled image present in JPEG file may be accessed and decoded using a JPEG decoder 802 to obtain decoded downscaled image. The decoded downscaled image may be output on display 804 of a UE.

Figure 9:
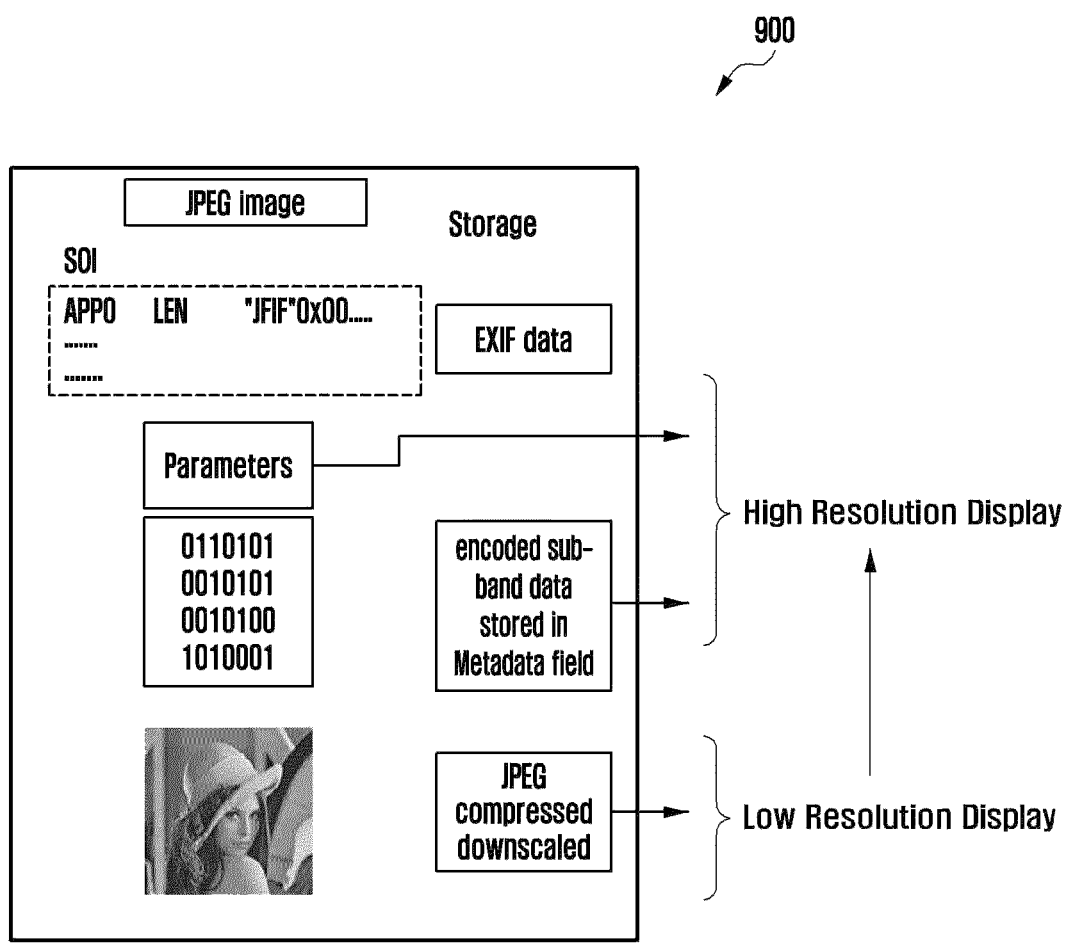
FIG. 9 is a schematic diagram illustrating transmission of a captured image, according to an embodiment of the present disclosure.

FIG. 9 is a schematic diagram illustrating transmission of a captured image, according to an embodiment of the present disclosure.

According to FIG. 9, it can be seen that the JPEG file stored in storage module of UE may comprise JPEG compressed downscaled image along with corresponding encoded sub-band information, and parameters. From the stored JPEG file, the user may view both low resolution image as well as high resolution image. If the user accesses only the compressed downscaled image, then the compressed downscaled image may be decoded and displayed for the low resolution display of the image. If the user wishes to access high resolution display of the image, then the compressed downscaled image along with the encoded sub-band information and the parameters may be accessed, and processed to obtain the high resolution image.

The present embodiments have been described with reference to specific example embodiments, it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method comprising:
obtaining a captured image having a resolution which is higher than a display resolution of an apparatus;
creating a low resolution image of the captured image for matching to the display resolution;
extracting a sub-band information associated with the low resolution image;
encoding the sub-band information;
storing, in a buffer of the apparatus in a single data file format, the low resolution image, the encoded sub-band information, and at least one parameter regarding at least one of the creating of the low resolution image, the extracting of the sub-band information, or the encoding of the sub-band information;
displaying the low resolution image;
modifying the at least one parameter independently from the displaying of the low resolution image while displaying the low resolution image;
storing the modified at least one parameter in the buffer;
receiving selection of the low resolution image;
decoding the encoded sub-band information associated with the low resolution image based on the at least one parameter;
reconstructing a high resolution image of the captured image based on the low resolution image and the decoded sub-band information; and
storing, in a storage of the apparatus, the reconstructed high resolution image,
wherein the low resolution image has a resolution that is lower than a resolution of the captured image and the high resolution image has a resolution that is higher than that of the low resolution image, and
wherein the at least one parameter comprises a photo editor effect that is applied to the low resolution image without applying an impact of the photo editor effect on the sub-band information.

2. The method of claim 1, in a first mode,
wherein the creating of the low resolution image comprises obtaining a filtered image by applying a blur filter to the captured image and creating a downscaled image as the low resolution image by performing downscaling on the filtered image,
wherein the extracting of the sub-band information comprises extracting the sub-band information associated with the captured image by taking a difference between the captured image and the filtered image, and
wherein the displaying of the low resolution image comprises obtaining a processed image by processing the downscaled image, and displaying the processed image.

3. The method of claim 2, wherein, in the first mode, the reconstructing of the high resolution image comprises:
upscaling the processed image;
processing the decoded sub-band information to obtain a conditioned sub-band information; and
adding the upscaled image and the processed sub-band information.

4. The method of claim 1, in a second mode,
wherein the creating of the low resolution image comprises transforming the captured image into a frequency data of the captured image and applying at least one of a low pass filter or a low frequency modulator to the frequency data of the captured image to obtain a low frequency data of the captured image as the low resolution image,
wherein the extracting of the sub-band information comprises applying at least one of a high pass filter or a high frequency modulator to the frequency data of the captured image, and
wherein the displaying of the low resolution image comprises obtaining a processed image by processing the low frequency data, and displaying the processed image.

5. The method of claim 4, wherein, in the second mode, the reconstructing of the high resolution image comprises:
processing the decoded sub-band information to obtain a conditioned sub-band information; and transforming the processed image at an inverse frequency transformer by adding the processed sub-band information.

6. The method of claim 1, in a third mode,
wherein the creating of the low resolution image comprises creating a downscaled image as the low resolution image by performing downscaling on the captured image,
wherein the extracting of the sub-band information comprises extracting the sub-band information associated with the captured image by taking a difference between the captured image and an upscaled image which is obtained by upscaling the downscaled image, and
wherein the displaying of the low resolution image comprises obtaining a processed image by processing the downscaled image, and displaying the processed image.

7. The method of claim 6, wherein, in the third mode, the reconstructing of the high resolution image comprises:
upscaling the processed image;
processing the decoded sub-band information to obtain a conditioned sub-band information; and
adding the upscaled image and the processed sub-band information.

8. The method of claim 1, wherein the at least one parameter includes at least one of a filter size, filter coefficients, intensity gains, color gains or any other linear or non-linear digital signal processing parameters.

9. The method of claim 1, further comprising:
updating the low resolution image by modifying the at least one parameter of the image;
processing the updated low resolution image; and
storing the updated low resolution image and the modified at least one parameter as a single file.

10. The method of claim 1, further comprising:
conditioning the low resolution image by an image signal processor (ISP) to produce a conditioned low resolution image;
processing the conditioned low resolution image using at least one photo editing parameter based on the photo editor effect during photo editing to produce a processed low resolution image; and
storing the at least one photo editing parameter by appending the at least one photo editing parameter with the at least one parameter as the single data file format.

11. The method of claim 1, wherein the at least one parameter is applied to the sub-band information in a same order as the at least one parameter was stored before the reconstruction of the high resolution image.

12. The method of claim 1, further comprising conditioning compressed downscaled data independently from the sub-band information, by:
decompressing downscaled data from an existing file container in the buffer;
conditioning the downscaled data using at least one photo-editor operation;
compressing the conditioned downscaled data;
replacing stored compressed downscaled data with the compressed downscaled data in the file container; and
appending photo-editing parameters in the file container.

13. An apparatus comprising:
a display; and
at least one processor configured to:
obtain a captured image having a resolution which is higher than a display resolution of the display,
create a low resolution image of the captured image based on the display resolution of the display,
extract a sub-band information associated with the low resolution image,
encode the sub-band information,
store, in a buffer of the apparatus in a single data file format, the low resolution image, the encoded sub-band information, and at least one parameter regarding at least one of the creating of the low resolution image, the extracting of the sub-band information, or the encoding of the sub-band information,
cause the display to display the low resolution image,
modify the at least one parameter independently from the displaying of the low resolution image while displaying the low resolution image,
storing the modified at least one parameter in the buffer,
receive a selection of the low resolution image,
decode the encoded sub-band information associated with the low resolution image based on the at least one parameter,
reconstruct a high resolution image of the captured image based on the low resolution image and the decoded sub-band information, and
store, in a storage of the apparatus, the reconstructed high resolution image,
wherein the low resolution image has a resolution that is lower than a resolution of the captured image and the high resolution image has a resolution that is higher than that of the low resolution image, and
wherein the at least one parameter comprises a photo editor effect that is applied to the low resolution image without applying an impact of the photo editor effect on the sub-band information.

14. The apparatus of claim 13, wherein, in a first mode, the at least one processor is further configured to:
obtain a filtered image by applying a blur filter to the captured image and create a downscaled image as the low resolution image by performing downscaling on the filtered image,
extract the sub-band information associated with the captured image by taking a difference between the captured image and the filtered image,
obtain a processed image by processing the downscaled image, and
cause the display to display the processed image.

15. The apparatus of claim 14, wherein, in the first mode, the at least one processor is further configured to:
upscale the processed image,
process the decoded sub-band information to obtain a conditioned sub-band information, and
add the upscaled image and the processed sub-band information.

16. The apparatus of claim 13, wherein, in a second mode, the at least one processor is further configured to:
transform the captured image into a frequency data of the captured image and apply at least one of a low pass filter or a low frequency modulator to the frequency data of the captured image to obtain a low frequency data of the captured image as the low resolution image,
apply at least one of a high pass filter or a high frequency modulator to the frequency data of the captured image,
obtain a processed image by processing the low frequency data, and
cause the display to display the processed image.

17. The apparatus of claim 16, wherein, in the second mode, the at least one processor is further configured to:
process the decoded sub-band information to obtain a conditioned sub-band information, and transform the processed image at an inverse frequency transformer by adding the processed sub-band information.

18. The apparatus of claim 13, wherein, in a third mode, the at least one processor is further configured to:
create a downscaled image as the low resolution image by performing downscaling on the captured image,
extract the sub-band information associated with the captured image by taking a difference between the captured image and an upscaled image which is obtained by upscaling the downscaled image,
obtain a processed image by processing the downscaled image, and
cause the display to display the processed image.

19. The apparatus of claim 18, wherein, in the third mode, the at least one processor is further configured to:
upscale the processed image,
process the decoded sub-band information to obtain a conditioned sub-band information, and
add the upscaled image and the processed sub-band information.

20. The apparatus of claim 13, wherein the at least one parameter includes at least one of a filter size, filter coefficients, intensity gains, color gains or any other linear or non-linear digital signal processing parameters.

21. The apparatus of claim 13, wherein the at least one processor is further configured to:
update the low resolution image by modifying the at least one parameter of the image,
process the updated low resolution image, and
store the updated image and the modified at least one parameter as a single file.

22. The apparatus of claim 13, wherein the at least one processor is further configured to:
condition the low resolution image by an image signal processor (ISP) to produce a conditioned low resolution image,
process the conditioned low resolution image using at least one photo editing parameter based on the photo editor effect during photo editing to produce a processed low resolution image, and
store the at least one photo editing parameter by appending the at least one photo editing parameter with the at least one parameter as the single data file format.

23. The apparatus of claim 13, wherein the at least one parameter is applied to the sub-band information in a same order as the at least one parameter was stored before the reconstruction of the high resolution image.

24. The apparatus of claim 13, wherein the at least one processor is further configured to:
decompress downscaled data from an existing file container in the buffer,
condition the downscaled data using at least one photo-editor operation,
compress the conditioned downscaled data,
replace stored compressed downscaled data with the compressed downscaled data in the file container, and
append photo-editing parameters in the file container.

* * * * *